United States Patent [19]

Misko

[11] Patent Number: 4,652,284
[45] Date of Patent: Mar. 24, 1987

[54] ANTI-SPLASH DRAIN FIXTURE

[75] Inventor: Robert J. Misko, Erie, Pa.

[73] Assignee: American Sterilizer Company, Erie, Pa.

[21] Appl. No.: 769,202

[22] Filed: Aug. 23, 1985

[51] Int. Cl.⁴ .............................................. B01D 19/00
[52] U.S. Cl. ....................................... 55/189; 55/190; 55/392
[58] Field of Search ................. 55/189, 190, 466, 392, 55/257 R, 57

[56] References Cited

U.S. PATENT DOCUMENTS

| | | | |
|---|---|---|---|
| 993,343 | 5/1911 | Brewster | 55/189 |
| 2,790,598 | 4/1957 | Beskow | 55/190 X |
| 2,893,860 | 7/1959 | Lorenz | 55/189 X |
| 2,927,658 | 3/1960 | Slater, Jr. | 55/189 |
| 2,944,626 | 7/1960 | Douglas et al. | 55/190 |
| 2,962,863 | 12/1960 | Caroli | 55/190 X |
| 3,109,714 | 11/1963 | Skeggs | 55/190 X |
| 3,116,133 | 12/1963 | Gates | 55/190 X |
| 3,116,999 | 1/1964 | Armbruster | 55/189 X |
| 3,934,989 | 1/1976 | Haugen | 55/189 X |
| 3,968,086 | 7/1976 | Romanowski | 261/77 |
| 4,460,387 | 7/1984 | Barron et al. | 55/192 |
| 4,467,830 | 8/1984 | Hutchinson | 137/590 |

FOREIGN PATENT DOCUMENTS 869041 3/1953 Fed. Rep. of Germany ........ 55/190

Primary Examiner—Richard L. Chiesa
Attorney, Agent, or Firm—Robert D. Yeager; George D. Dickos

[57] ABSTRACT

Apparatus is provided for allowing the draining of a liquid containing an entrained gas from a discharge tube, the separation of the gas from the liquid and the directing of the liquid to a drain pipe. The apparatus includes a vertical elongated conduit member having venting apertures formed therein and first and second vertically inclined arms extending therefrom. An elongated directing conduit is coaxially supported within the elongated conduit at a distance beneath the discharge tube to form an air gap therebetween. In operation, a source of suction is connected to the first arm and draws atmospheric air into the system through the venting apertures and through the second arm. The discharge tube is then opened allowing the liquid/gas mixture to enter the drain apparatus in which the gaseous constituent is drawn from the liquid via the air gap and the liquid constituent is conducted past the venting apertures by the directing conduit thereby avoiding any splashing and escape of the liquid.

13 Claims, 2 Drawing Figures

ANTI-SPLASH DRAIN FIXTURE

BACKGROUND OF THE INVENTION

1. Field of the Invention

The present invention relates to a fixture for accommodating the draining of a liquid containing an entrained gas from a vessel and, in particular, to a drain fixture which allows the draining of a liquid containing a toxic gaseous susbstance from a vessel while providing a means for withdrawing the toxic gases therefrom and for preventing the splashing of the liquid and its escape to the environment.

2. Description of the Prior Art

In many diverse environments it is necessary to allow the draining of a liquid from a vessel. In some such environments the liquid to be drained includes an entrained gas, which gas may be of a toxic nature. One example of such a system includes a sterilizer apparatus which employs a sterilant which may utilize a toxic gas such as ethylene oxide to accomplish sterilization. During the exhaust phase of the sterilization cycle, the ethylene oxide gas is mixed with water and expelled to the waste drain. As exposure to the ethylene oxide gas is harmful and can be fatal to humans, such gas must be removed from the liquid carrier prior to the liquid entering the environment.

A previously attempted means for accomplishing the removal of gases from a liquid included a conduit having vent holes formed therein and an arm perpendicular thereto which was connected to a suction means which drew air into the system via the holes. Baffles were provided within the body of the conduit to reduce the escape of splashing liquid as it passed the holes. The conduit terminated in a funnel which directed the liquid into a drain means.

While current plumbing codes require an air gap, some means are required for preventing the escape of splashing liquids thru this air gap, previous systems, such as that described above, have failed to effectively protect against this inherent, and most dangerous, limitation. Such prior art systems have not proven effective in preventing the splashing of the liquid and the escape of gas from the system around the baffles and through the vents. This escape of a toxic liquid/gas mixture is most alarming in that the toxic splashing liquid may contact workers in the vicinity of the system and also may contain and release the toxic gas entrained therein which is also harmful to employees.

The subject invention is directed toward an improved apparatus for allowing the draining of liquids from a vessel which overcomes, among others, the above-discussed problems and which provides an apparatus for safely and effectively allowing the discharge of a liquid/gas mixture from a vessel while avoiding the potentially disastrous effects of the splashing of the liquid.

SUMMARY OF THE INVENTION

In accordance with the present invention, there is provided apparatus for allowing the draining and disposal of a liquid containing an entrained gas which allows the gas to be separated from the liquid carrier and is effective in preventing the splashing of liquid from the drain system. The drain fixture provided herein is disposed between the discharge tube and drain pipe of, e.g., a vessel from which a liquid containing an entrained toxic gas is to be drained. A wye conduit member is axially connected intermediate the discharge tube and the drain pipe. Dual venting apertures are provided on the conduit body. A source of suction is connected to one arm of the wye while the other may be vented to the atmosphere. A directing conduit is provided coaxially within and supported by the wye conduit slightly beneath the discharge tube so as to provide an air gap therebetween.

In operation, the suction means is activated thereby drawing atmospheric air into the drain fixture through the venting apertures and through the open arm of the wye conduit. The discharge tube is opened to the vessel and the liquid/gas combination enters the wye conduit due to the force of gravity thereon. The entrained gas leaves the liquid at the air gap and is drawn into the suction arm of the wye conduit along with atmospheric air. The liquid constituent is directed past the venting apertures and into the drain pipe while splashing of the liquid from the system is prevented.

Accordingly, the present invention provides solutions to the aforementioned problems relative to the disposal of a toxic liquid/gas mixture. As this invention provides an effective means of separating a toxic gaseous substance from its liquid carrier the potentially catastrophic problems resulting from the gas escaping to the atmosphere are eliminated. In addition, the herein provided apparatus avoids the serious concerns associated with the splashing of the liquid from the system into the atmosphere, which concerns have not been adequately addressed in prior art drain systems.

These and other details, objects and advantages of the invention will become apparent as the following description of the present preferred embodiment thereof proceeds.

BRIEF DESCRIPTION OF THE DRAWINGS

In the accompanying drawings, I have shown a present preferred embodiment of the invention wherein.

DETAILED DESCRIPTION OF THE PREFERRED EMBODIMENTS

Figure 1:
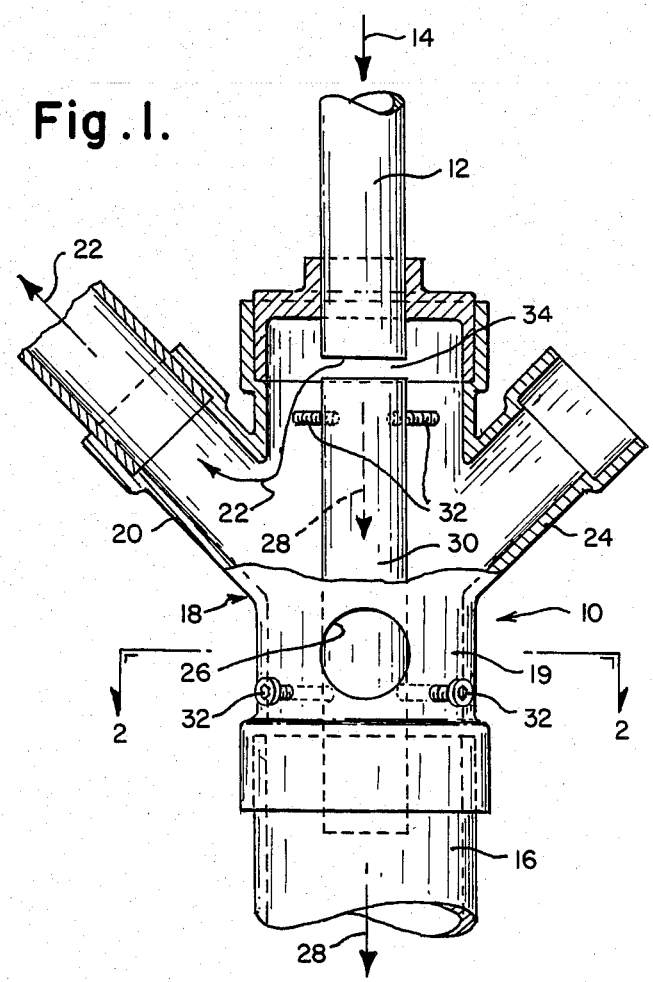
FIG. 1 is a side sectional elevation and partial cutaway view of the drain system provided herein; and, FIG. 2 is an end section view of a portion of the present apparatus taken along lines 2—2 in FIG. 1.
Figure 2:
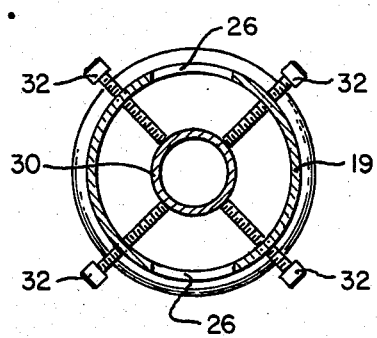

Referring now to the drawings wherein the showings are for purposes of illustrating the present preferred embodiment of the invention only and not for limiting same, the figures show a drain fixture, generally indicated 10 for allowing the draining of a liquid containing an entrained gas from the discharge tube 12 of a vessel (not shown), which may comprise a sterilizer apparatus, in which the liquid/gas mixture is disposed. The present invention may be utilized in any application in which a gas is entrained in a liquid, but it is most advantageously employed where the gas is of a toxic nature. For the purposes of the present DETAILED DESCRIPTION OF THE PREFERRED EMBODIMENTS reference will be made to a liquid, such as water, which has entrained therewithin a gas, such as ethylene oxide, the combination being generally indicated by the arrow designated 14.

Subsequent to the separation of the gaseous substance from the liquid carrier as described below, the liquid is passed into a drain pipe 16 which discharges the liquid to an appropriate sewage system following any additionally required processing thereof which depends upon the particular liquid and gas involved.

As such, the drain fixture 10 is disposed coaxially between discharge tube 12 and drain pipe 16 and affixed therebetween by appropriate plumbing connections. Preferably, drain fixture 10 includes a double wye member 18 having the central trunk portion thereof 19 connected intermediate discharge tube 12 and drain pipe 16. A first upwardly inclined arm 20 of the wye member 18 is connected to an appropriate source of suction (not shown) to draw the gaseous constituent, indicated by arrows 22, of the liquid/gas mixture 14 to a filter means 10 (also not shown), as is known in the art. A second upwardly inclined arm 24 of the double wye member 18 is preferably vented to the atmosphere to provide an additional source of air to carry away the gas 22. However, it should be understood that the present invention is operable with the provision of only first arm 20 without requiring second arm 24.

Preferably two, but at least one, venting apertures 26 are provided on opposing sides of trunk 19 of wye member 18 on the sides thereof remote from first and second arms, 20 and 24 respectively. The venting apertures 26 must be located at a distance below the end of discharge tube 12 of at least twice the diameter of discharge tube 12. Further, the centers of venting apertures 26 will be preferably located beneath the lowermost points of the junctions of arms 20 and 24 with trunk 19. The total combined diameters of venting apertures 26 must be greater than the diameter of the discharge tube 12. Additionally preferably, the diameter of each venting aperture 26 will be greater than that of discharge tube 12.

In order to conduct the liquid portion of the liquid/gas mixture, generally indicated by arrows 28, away from discharge tube 12 and into drain pipe 16, there is provided a directing conduit 30. Directing conduit 30 consists of a pipe member of a diameter which is less than trunk 19 and equal to or greater than that of discharge tube 12. Directing conduit 30 is supported coaxially within trunk 19 by means of supports 32 which may consist of screws. The top of directing conduit 30 is disposed beneath the level of discharge tube 12 so as to provide an air gap 34 therebetween. The height of air gap 34 is preferably less than the diameter of the discharge tube 12. The bottom of directing conduit 30 is disposed beneath the bottoms of venting apertures 26 and, preferably, extends within drain pipe 16.

In operation, the suction source is activated thereby causing atmospheric air to be drawn into drain fixture 10 through venting apertures 26 and, if included, second arm 24. Discharge tube 12 is opened thereby allowing the liquid and gas combination to enter the top of drain fixture 10 via discharge tube 12. When the liquid/gas mixture 14 reaches air gap 34 the gaseous constituent 22 is allowed to escape from liquid constituent 28. The gaseous constituent 22 exits via air gap 34 and enters first arm 20 along with the atmospheric air and is directed to the filter means. The liquid constituent 28 is conducted along directing conduit 30 safely past venting apertures 26 and into drain pipe 16 thereby avoiding any splashing of the liquid constituent 28 from the drain fixture 10.

Following the complete discharge of the liquid and gas mixture 14 from the vessel the discharge tube 12 is closed and the suction is stopped.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for separating a fluid containing an entrained gas which is vertically discharged from a dischrge tube from the entrained gas and for directing the fluid into a drain pipe comprising:
   an elongated conduit disposed coaxially with and in fluid communication between said discharge tube and said drain pipe, said elongated conduit being provided with a first arm which is in fluid communication with a suction means;
   a directing conduit coaxial with and disposed within said elongated conduit, said directing conduit extending from a point beneath said discharge tube toward said drain pipe and being effective to produce an air gap between said discharge tube and said directing conduit;
   means for supporting said directing conduit within said elongated conduit; and
   at least one venting aperture formed in the body of said elongated conduit at a level thereon below said air gap and above the lowermost point of said directing conduit.

2. Apparatus of claim 1 in which the axis of said first arm is upwardly inclined relative to the axis of said elongated conduit.

3. Apparatus of claim 2 further comprising more than one venting aperture disposed on said elongated conduit at a level thereon below said air gap and above the lowermost point of said directing conduit.

4. Apparatus of claim 3 in which the centers of said venting apertures are disposed at a level along said elongated conduit beneath the lowermost point of the juncture of said arm with said elongated conduit.

5. Apparatus of claim 4 further comprising two venting apertures in opposing relation on the sides of said elongated conduit remote from said first upwardly inclined arm.

6. Apparatus of claim 5 in which the center points of said venting apertures are disposed beneath said discharge tube a distance greater than twice the diameter of said discharge tube.

7. Apparatus of claim 1 in which said means for supporting said directing conduit comprises screws affixed to said elongated conduit and to said directing conduit.

8. Apparatus of claim 1 in which the bottom of said directing pipe extends beneath the top of said drain pipe.

9. Apparatus of claim 1 in which the height of said air gap is less than the diameter of said discharge tube.

10. Apparatus of claim 1 further comprising a second arm joined to said elongated conduit in symmetrical opposition to said first upwardly inclined arm, the end of said second arm being open to the atmosphere.

11. Apparatus of claim 10 in which the axes of said first and said second arms are upwardly inclined relative to the axis of said elongated conduit.

12. Apparatus of claim 10 in which the axes of said first and second arms are perpendicular to the axis of said elongated conduit.

13. Apparatus of claim 1 in which the axis of said first arm is perpendicular to the axis of said elongated conduit.

* * * * *